Patented Dec. 5, 1950

2,532,588

UNITED STATES PATENT OFFICE 2,532,588

AZO DYESTUFF FOR DYEING ANIMAL FIBERS IN SHADES OF BROWN

Harold E. Woodward, Penns Grove, N. J., assignor to E. I. du Pont de Nemours & Company, Wilmington, Del., a corporation of Delaware No Drawing. Application October 4, 1947, Serial No. 778,023

1 Claim. (Cl. 260—202)

This invention relates to a novel soluble monazo dye suitable for dyeing animal fibers, such as wool and hair, in strong shades of brown.

It is among the objects of the present invention to provide a monazo dyestuff suitable for dyeing animal fibers in shades of brown. Another object of the invention is to provide such a dyestuff which has good affinity for animal fibers and good fastness properties. Other objects of the invention will be apparent from the following description which includes an illustrative embodiment of the invention in which parts are expressed in parts by weight unless otherwise specified.

Example 1

A solution was made by dissolving 218 grams of the sodium salt of 2-sulfo-4-nitro-aniline in 2 liters of water at 50° C. The solution was acidified by adding 2.5 equivalents of hydrochloric acid cooled to 10° C. and the primary arylamine was diazotized in the usual manner by adding one equivalent of sodium nitrite. A solution was made by dissolving 197 grams of 1-hydroxy-2-naphthoic acid in two liters of water containing 42 grams of sodium hydroxide and 106 grams of sodium carbonate. Coupling in alkaline medium was effected by pouring the diazo solution into the solution of coupling component. The resulting product of coupling was salted out at 60° C. and the solids were recovered by filtering. The product was then redissolved in 4 liters of water at 90° C. and 10 grams of disodium phosphate were added. After stirring one-half hour, activated charcoal and diatomaceous earth were added to clarify the solution, and the clarified solution was made acid to Congo red for precipitating the dyestuff. The solid dyestuff was recovered by filtration, mixed with 80 grams of solid sodium carbonate and dried.

The product was a brown powder which was soluble in water and dyed bleached human hair mordanted with iron sulfate in shades of brown. The dyestuff has good affinity for animal fibers and has good fastness to washing.

The product in its acid form is represented by the formula

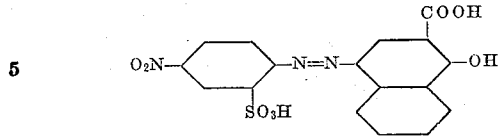

The product made by coupling the diazo of 2-sulfo-4-nitro-aniline with 2-hydroxy-3-naphthoic acid (U. S. P. 743,071) is only slightly soluble in water in the form of its sodium salt and it is further distinguished from the compound of the present invention in that the product made with 2-hydroxy-3-naphthoic acid produces bright red calcium and barium lakes.

I claim:

The compound which in its acid form is represented by the formula

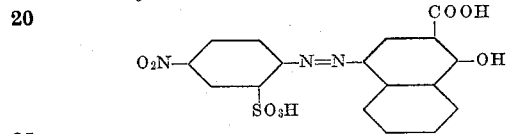

the disodium salt of said compound being a brown dye for hair and being readily soluble in water.

HAROLD E. WOODWARD.

REFERENCES CITED

The following references are of record in the file of this patent:

UNITED STATES PATENTS

| Number | Name | Date |
|---|---|---|
| 424,019 | Nietzki | Mar. 25, 1890 |
| 743,071 | Gley et al. | Nov. 3, 1903 |
| 2,333,427 | Keller | Nov. 2, 1943 |

FOREIGN PATENTS

| Number | Country | Date |
|---|---|---|
| 219,500 | Germany | Mar. 2, 1910 |

OTHER REFERENCES

Cain: "The Synthetic Dyestuffs," ed. 6, p. 10, 56, Griffin, London, 1923.